UNITED STATES PATENT OFFICE.

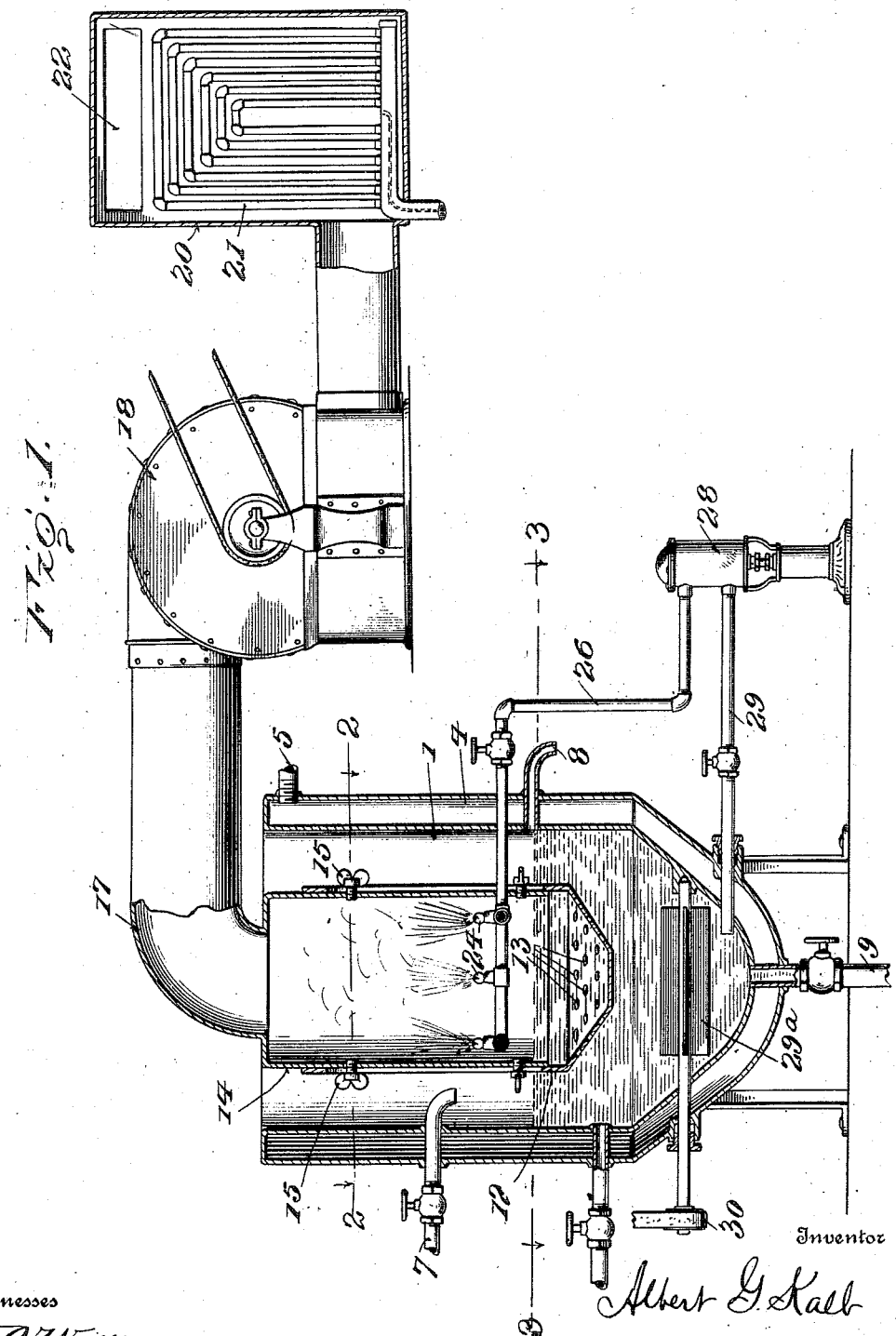

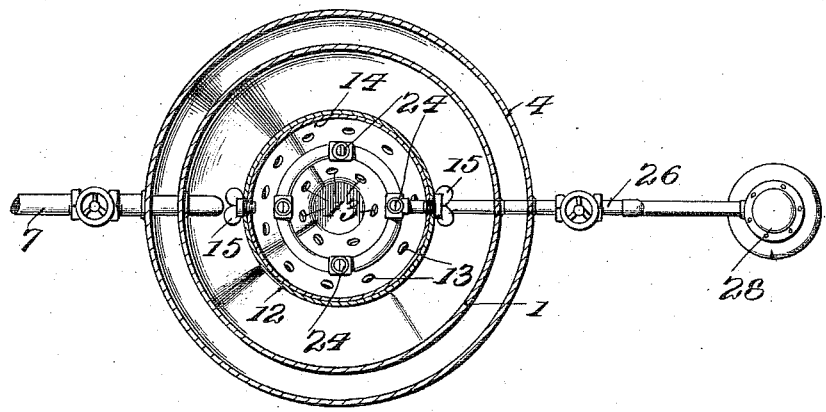
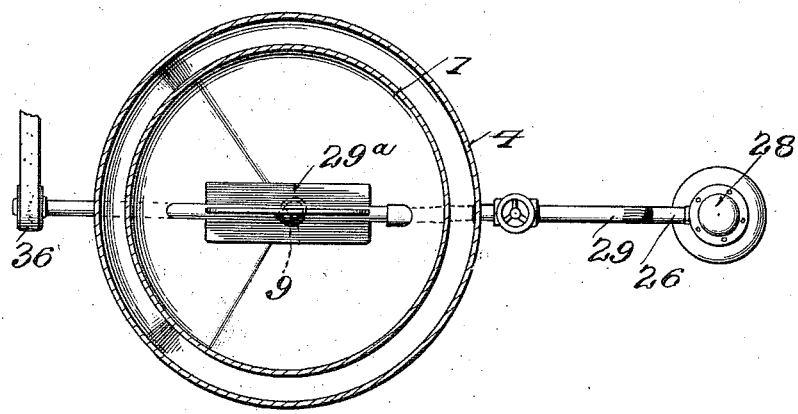

ALBERT G. KALB, OF CHICAGO, ILLINOIS, ASSIGNOR TO NATURAL DRY PRODUCTS COMPANY, OF AUGUSTA, MAINE, A CORPORATION OF MAINE.

CONDENSING FLUID SUBSTANCES.

957,686.      Specification of Letters Patent.      Patented May 10, 1910.

Application filed February 4, 1909. Serial No. 476,049.

*To all whom it may concern:*

Be it known that I, ALBERT G. KALB, a citizen of the United States of America, and resident of Chicago, in the county of Cook and State of Illinois, have invented certain new and useful Improvements in Condensing Fluid Substances, of which the following is a specification.

This invention relates to improvements in method of condensing fluid substances and the invention is adapted more particularly for condensing milk.

The object of my invention is to invent a simple method which will make it possible to condense milk by an economical process and without the use of undue heat.

In the preferred form of apparatus for carrying out my method, the material to be condensed is contained in a suitable tank which may be heated as by a water or steam jacket and with this tank I employ a spraying chamber in which the material to be condensed is introduced in the form of a fine spray and at the same time subjected to a constantly maintained current of dry warm air, the said air being replenished in great volume and acts upon the sprayed milk to take up the liquid particles of the same and the air is then forced through the body of the milk and out of the tank in any desirable way.

My invention consists of a method, broadly speaking, as just described and as hereinafter claimed.

In the drawings accompanying and forming part hereof Figure 1 is a view, part in side elevation but mostly in vertical section, of apparatus constructed to carry out my method. Fig. 2 is a horizontal section through the line 2, 2 of Fig. 1. Fig. 3 is a horizontal section through the line 3, 3 of Fig. 1.

Referring now to the details of the drawings by numerals: 1 designates a tank which may be open at the top as illustrated and which is provided with a heating jacket 4 to which a heating medium may be supplied through the pipe 5 shown in Fig. 1. The tank also is provided with a supply pipe 7, an overflow 8, and a discharge pipe 9.

Within the tank is a spraying chamber formed of two telescopic members 12 and 14, the member 12 being adjustably supported by the member 14 by means of wing nuts 15 so that the member 12 may be lowered within the tank 1 as may be necessary in order to insure that the lower end of said tank shall always be submerged in the material to be condensed and to make it possible to lower said member 12 as the fluid substance lowers in the operation of condensing the same. The member 14 is provided with an inlet pipe 17 of large area which is connected with a blower 18 which exhausts air from a heating jacket 20 provided with a heater 21 and an inlet 22, the whole being so arranged that all the air which is fed by the blower 18 to the spraying chamber 14 must enter through the inlet 22 and be subjected to the drying and warming action of the heating coils of the heater 21.

The lower adjustable member 12 of the spraying chamber is provided with perforations 13 through which the material to be condensed passes and finds the same level within the spraying tank as it does in the condensing tank 1. The spraying chamber is also provided with a series of spraying devices or atomizers 24 supplied by a pipe 26 connected with a pump 28 and this pump connects with the bottom of the tank 1 by means of the pipe 29 and by the action of the pump 28 the material being condensed is drawn from the tank 1, forced through the pipe 26 through the spraying devices 24, where it is subjected to the action of large volumes of constantly supplied heated and dried air introduced into the spraying chamber by means of the aforesaid blower 18. Within the bottom of the tank 1 is also provided an agitator 29ª operated from a pulley 30 and this agitator 29ª is adapted to create a slight current in the liquid to be condensed by drawing said material down one side of the chamber and permitting it to flow up the other side, thus keeping the material of uniform consistency, and preventing the formation of foam.

The operation of my invention is as follows: By means of the blower 18, air in large volumes is drawn through the inlet 22 and heated and dried by heater 21 and forced through the inlet 17 into the spraying chamber. In order to find exit from this spraying chamber the air must pass down through the perforations 13 in the lower member 12 of said tank and pass through the material to be condensed where it may escape freely through the open top of the tank 1 but in doing this the large volume of air introduced into the spraying chamber comes in contact with the sprayed or atomized particles from the spraying devices 24 and of course tends to absorb to a large extent the liquid from said particles, thereby carrying off the moisture from these atomized particles and gradually condensing the material to any extent desired. As the material is condensed, the adjustable member 12 may be lowered to keep its perforated end surrounded by the material being condensed and when said material is condensed to the desired consistency it may be delivered through the discharge pipe 9, and a new supply of liquid subjected to the condensation process.

From the foregoing and the accompanying drawings, it will be seen that I have invented a method of condensing fluid substances which is carried out by an apparatus of extremely simple and effective form, by atomizing or spraying the liquid into a spraying chamber in which is constantly maintained a current of dry warm air which is renewed in sufficient quantities to thoroughly absorb the moisture from the sprayed particles.

It will be seen that by my method I obtain the desired result rapidly and economically.

It is obvious that changes may be made in the apparatus for carrying out my method without departing from the spirit thereof, the scope of the invention being set forth by the appended claims.

The apparatus illustrated and described is not herein claimed, but forms the subject matter of a separate application, filed July 30, 1908, Serial Number 446,169.

What I claim as my invention is:

1. The method of condensing fluid substances which consists in introducing the material in atomized condition to a current of air, maintaining the air in motion, and forcing the air through the body of material being treated, substantially as described.

2. The method of condensing fluid substances which consists in subjecting air to a spray of liquid material and in forcing the air so sprayed through the material being treated, substantially as described.

3. The method of condensing fluid substances which consists in subjecting air to a spray of liquid material, in forcing the air so sprayed through the material, and in keeping the liquid in motion, substantially as described.

Signed by me at Chicago, Illinois, this 25th day of January 1909.

ALBERT G. KALB.

Witnesses:
GEO. F. YATES,
W. F. HAYDEN.